United States Patent [19]

Shaffer et al.

[11] Patent Number: 5,091,165

[45] Date of Patent: Feb. 25, 1992

[54] CALCIUM HYPOCHLORITE PRODUCT

[75] Inventors: John H. Shaffer; James K. Melton; Garland E. Hilliard, all of Cleveland, Tenn.

[73] Assignee: Olin Corporation, Cheshire, Conn.

[21] Appl. No.: 560,490

[22] Filed: Jul. 23, 1990

Related U.S. Application Data

[63] Continuation of Ser. No. 353,572, May 18, 1989, abandoned.

[51] Int. Cl.$^5$ ............................................. C01B 11/06
[52] U.S. Cl. .................................... 423/474; 252/187.29
[58] Field of Search .................... 423/474; 252/187.29

[56] References Cited

U.S. PATENT DOCUMENTS

| | | | |
|---|---|---|---|
| 1,481,039 | 1/1924 | Taylor et al. | 423/474 |
| 1,713,669 | 5/1929 | MacMullin et al. | 423/474 |
| 3,544,267 | 12/1970 | Dychdala | 423/265 |
| 3,669,894 | 6/1972 | Faust | 423/474 X |
| 4,146,578 | 3/1979 | Brennan et al. | 423/473 |
| 4,147,761 | 4/1979 | Wojtowicz et al. | 423/473 |
| 4,355,014 | 10/1982 | Murakami et al. | 423/474 X |
| 4,416,864 | 11/1983 | Wojtowicz | 423/474 |

Primary Examiner—John Niebling
Assistant Examiner—Brian M. Bolam
Attorney, Agent, or Firm—James B. Haglind; Paul Weinstein

[57] ABSTRACT

A calcium hypochlorite composition consists essentially of at least 75 percent by weight of Ca(OCl)$_2$, from about 6 to about 14 percent by weight of water, and less than 1.5 percent by weight of an alkali metal chloride. The novel composition provides increased amounts of sanitizing and disinfecting to, for example, water bodies while remaining safe with respect to thermal decomposition. Further, the composition reduces the rate of chlorine evolution during storage.

4 Claims, No Drawings

CALCIUM HYPOCHLORITE PRODUCT

This application is a continuation of application Ser. No. 07/353,572, filed May 18, 1989, now abandoned.

Calcium hypochlorite is well known as a disinfectant and sanitizing agent which has been available commercially for over 50 years. It was produced in its early years as an anhydrous product having an available chlorine concentration of about 80 percent and a water content of less than 2 percent by weight. This product was an effective sanitizing agent, for example, for water in swimming pools. However, it was found to be susceptible to exothermic decomposition when contacted by, for example, open flames or lighted cigarettes. To reduce this safety hazard, the available chlorine concentration in commercial calcium hypochlorite products was reduced below 75 percent.

More recently, hydrated calcium hypochlorite compositions have been developed having a water content of at least 4 percent by weight, for example from 4 to 15 percent by weight. These "hydrated" calcium hypochlorite compositions may be prepared by the methods described, for example, in U.S. Pat. No. 3,544,267, issued to G. R. Dychdala on Dec. 1, 1970. The increase in product safety with respect to thermal decomposition was accomplished by a further reduction in available chlorine concentration, with commercial products having an available chlorine concentration of about 70 percent.

In a labor intensive process, J. P. Faust (U.S. Pat. No. 3,669,894, issued June 13, 1972) produced calcium hypochlorite having improved safety with respect to thermal decomposition having a concentration of 75 to 82 percent of $Ca(OCl)_2$ and 6 to 12 percent water. The composition also contained inert materials usually associated with the process of manufacture such as sodium chloride, calcium hydroxide, calcium chloride and calcium carbonate.

The commercial processes for producing calcium hypochlorite react lime with a chlorinating agent such as chlorine which results in calcium hypochlorite products containing substantial amounts of calcium chloride or an alkali metal chloride such as sodium chloride. As calcium chloride is a hygroscopic salt, it is a common practice to react the calcium hypochlorite product with an alkali metal hypochlorite to convert the calcium chloride present to additional calcium hypochlorite and as a by-product form an alkali metal chloride. These reactions are represented by the following equations:

$$2Ca(OH)_2 + 2Cl_2 \rightarrow Ca(OCl)_2 + CaCl_2 + 2H_2O \quad (I)$$

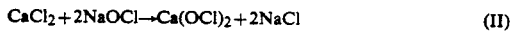

$$CaCl_2 + 2NaOCl \rightarrow Ca(OCl)_2 + 2NaCl \quad (II)$$

Thus, commercial calcium hypochlorite products produced by the processes presently available contain significant amounts of an alkali metal chloride such as sodium chloride.

Calcium hypochlorite products after storage for relatively long periods of time evolve chlorine which is a strongly corrosive agent. This chlorine can combine with moisture present in the container to form acidic and corrosive agents which attack the container. The evolution of chlorine is directly related to the concentration of chlorides (alkali metal chlorides) in the product.

Now it has been found that a calcium hypochlorite product can be produced which has an increased available chlorine concentration while remaining softened with respect to thermal decomposition.

Further, the novel calcium hypochlorite product provides significantly lowered rates of chlorine evolution during storage.

These and other advantages are accomplished in a calcium hypochlorite composition consisting essentially of at least 75 percent of $Ca(OCl)_2$, 6 to 14 percent water, and less than 1.5 percent of an alkali metal chloride.

The novel composition of the present invention is produced by reacting an aqueous slurry of lime with a concentrated solution of hypochlorous acid. The process is carried out in the absence of other chlorinating agents such as chlorine or alkali metal hypochlorites which result in the formation of alkaline earth metal or alkali chlorides which are present in the calcium hypochlorite product.

One method of producing these high purity concentrated HOCl solutions is that in which gaseous mixtures, having high concentrations of hypochlorous acid vapors and chlorine monoxide gas and controlled amounts of water vapor are produced, for example, by the process described by J. P. Brennan et al in U.S. Pat. No. 4,746,578, which is incorporated in its entirety by reference. The gaseous mixture is then condensed to produce a concentrated hypochlorous acid solution.

The concentrated hypochlorous acid solution employed as a reactant contains at least 35, and preferably at least 40 percent by weight of HOCl. The solution is substantially free of ionic impurities such as chloride ions, chlorate ions, and alkali metal ions and has low concentrations of dissolved chlorine. For example, concentrations of the chloride ion are less than about 50 parts per million; the alkali metal ion concentration is less than about 50 parts per million; and the chlorate ion concentration is no more than about 100 parts per million. The dissolved chlorine concentration in the hypochlorous acid solution is less than about 2 percent, and preferably less than about 1 percent by weight.

The concentrated hypochlorous acid is initially reacted with lime. The lime employed can be any suitable lime having an active lime content of from about 85 to about 99, and preferably from about 90 to about 98 percent, where active lime is defined as the weight percent of $Ca(OH)_2$ in the lime. The lime employed usually contains impurities such as iron compounds, silica, aluminum salts, magnesium salts, manganese, unburned limestone (calcium carbonate and magnesium carbonate) and other compounds in trace quantities. These impurities represent from about 1 to about 15, and preferably from about 2 to about 8 percent by weight of the lime. More preferred are limes having low concentrations of heavy metal compounds such as those of iron and manganese.

A slurry of neutral calcium hypochlorite dihydrate crystals is produced in the reaction which is expressed by the equation:

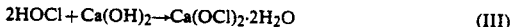

$$2HOCl + Ca(OH)_2 \rightarrow Ca(OCl)_2 \cdot 2H_2O \quad (III)$$

The slurry of calcium hypochlorite dihydrate solids is suspended in an aqueous solution of calcium hypochlorite.

The reaction between the concentrated hypochlorous acid solution and the lime slurry is carried out at a temperature in the range of from about 15° to about 40° C., and preferably from about 25° to about 35° C.

While the process may be conducted batchwise, it is preferably operated with the hypochlorous acid solution and a slurry of lime being charged continuously to the reactor. The rate of addition of reactants provides the reaction mixture with a slurry having a suspended solids concentration in the range of from about 5 to about 20 percent.

A slurry of neutral calcium dihydrate crystals is continuously recovered from the reaction mixture. The slurry may be fed directly to a dryer; however, in a preferred embodiment, it is concentrated by removal of a mother liquor. Any suitable solid-liquid separation method may be used including filtration and centrifugation.

The moist cake formed during the separation method may be used directly in the treatment of water systems such as swimming pools and the like, but is generally dried and stored prior to use.

The moist cake contains, on a dry basis, an available chlorine concentration of at least 85 percent by weight, less than about 5 percent by weight of all inert materials including chlorides and calcium salts, and the remainder water.

The moist cake is dried by known means, for example, using a spray dryer, turbodryer or vacuum dryer where the appropriate temperature ranges are employed to reduce the water content to the desired level.

The mother liquor recovered from the separation of the calcium hypochlorite dihydrate crystals is a concentrated solution containing at least 15 percent, and normally from about 20 to about 25 percent by weight of $Ca(OCl)_2$. This concentrated calcium hypochlorite solution having very low concentrations of impurities may be used or sold as a bleach solution. As a bleach the calcium hypochlorite solution is of very high purity being substantially free of alkali metal chlorides and containing less than about 4 percent, preferably less than about 3 percent, and more preferably less than about 2.5 percent by weight of calcium chloride.

In a preferred embodiment it is used in the preparation of the lime slurry to minimize the amount of water added to the process. Admixing the calcium hypochlorite mother liquor with fresh lime produces dibasic calcium hypochlorite in a reaction represented by the following equation:

$$Ca(OCl)_2 + 2Ca(OH)_2 \rightarrow Ca(OCl)_2 \cdot 2Ca(OH)_2 \quad \text{(III)}$$

Following drying, the hydrated granular calcium hypochlorite product contains at least 75 percent, preferably at least 80, and more preferably from about 82 to about 87 percent by weight of $Ca(OCl)_2$. The hydrated calcium hypochlorite has a water content in the range of 6 to about 14, and preferably from about 8 to about 12, and more preferably from about 8 to about 10 percent by weight. Surprisingly, the high purity calcium hypochlorite product of the present invention is substantially free of alkali metal chlorides and contains less than about 3 percent, preferably less than about 2.5 percent, and more preferably less than about 2 percent by weight of calcium chloride.

The dried calcium hypochlorite product is then placed in suitable containers, with or without prior size classification or other processing such as pelletizing, prior to use in water treatment or other utility.

While commercial hydrated calcium hypochlorite products presently available have had to lower the concentrations of $Ca(OCl)_2$ in the product to permit the water contents required for improved safety and handling properties, the novel product of the present invention has the required water content and yet includes very high assays of $Ca(OCl)_2$.

In addition, the very low concentrations of chlorides in the product substantially reduces the evolution of chlorine during storage, particularly at elevated temperatures.

Further, the product of the present invention dissolves more rapidly in water than granular hydrated calcium hypochlorite products commercially available.

To further illustrate the present invention, the following examples are presented without any intention of being limited thereby. All parts and percentages are by weight unless otherwise indicated.

EXAMPLE 1

A concentrated hypochlorous acid solution containing 45 percent by weight of HOCl was continuously added to a hypochlorinator reactor at a rate of 69 parts per hour. Also added to the reactor at a rate of 49 parts per hour was an aqueous slurry of lime containing 30 percent by weight of $Ca(OH)_2$.

The reaction mixture was agitated and maintained at a temperature of about 30° C. A slurry of calcium hypochlorite dihydrate was produced which was conveyed to a filter which separated a paste of calcium hypochlorite. The assay of the calcium hypochlorite paste is given in Table I below. The calcium hypochlorite dihydrate paste was dried by a spray dryer to a product containing 83.67 percent by weight of $Ca(OCl)_2$. The product assay is given in Table I below.

EXAMPLE 2

The process of Example 1 was carried out using a hypochlorous acid solution containing 40.6 percent by weight of HOCl.

The results are included in Table I below.

TABLE I

|  | Example 1 | Example 2 |
|---|---|---|
| $Ca(OCl)_2$ Paste Assay Percent |  |  |
| $Ca(OCl)_2$ | 28.92 | 27.84 |
| $Ca(OH)_2$* | 0.26 | 0.05 |
| $CaCl_2$ | 0.84 | 0.94 |
| NaCl | 0.24 | 0.01 |
| $Ca(ClO)_3$ | 0.5 | 0.67 |
| $H_2O$ | 69.25 | 70.50 |
| $Ca(OCl)_2$ Product Assay Percent |  |  |
| $Ca(OCl)_2$ | 83.67 | 82.12 |
| $Ca(OH)_2$* | 4.88 | 5.88 |
| $CaCl_2$ | 0.6 | 1.68 |
| NaCl | 0.66 | 0.01 |
| $Ca(ClO)_3$ | 2.47 | 1.82 |
| $H_2O$ | 7.72 | 8.51 |

*Total alkalinity expressed as $Ca(OH)_2$.

EXAMPLE 3

Five grams of a granular hydrated calcium hypochlorite having an available chlorine concentration of 81.30 percent, a water content of 10.2 percent, and a particle size range of about 300 to 850 microns ($-20/+50$ standard mesh) were placed on the surface of a tank of water four feet deep. No circulation or agitation was present during the initial dissolution period. The granular hydrated calcium hypochlorite particles passed through the water for a period of one minute. At the end of this period, any undissolved particles were removed from the bottom of the tank. A pump was operated for five minutes to provide a homogeneous solution. The available chlorine concentration of this solution was then determined and the percentage of the product dissolved was calculated. The results are given in Table II below.

COMPARATIVE EXAMPLE A

The procedure of Example 3 was repeated exactly with five grams of granular calcium hypochlorite having an available chlorine concentration of 71.51 percent, a water content of 8.6 percent, and 14.4 percent by weight of sodium chloride. The calcium hypochlorite granules were of identical particle size range of those in Example 3. The results are given in Table II below.

TABLE II

| | Hydrated Ca(OCl)$_2$ Particles Dissolved | | | |
|---|---|---|---|---|
| Example No. | % Particles Dissolved | Comparative Example | % Particles Dissolved | % Difference |
| 3 | 95.8 | A | 78.2 | 17.6 |

Example 3 shows the greatly improved dissolution rate of the product of the present invention over that commercially available at present.

EXAMPLES 4 AND 5

Twenty grams of the granular hydrated calcium hypochlorite of the type of Example 3 containing 79.8 percent available chlorine and 8.5 percent water were placed in each of two vials and the vials sealed with a rubber stopper. One vial was stored at ambient temperature and the second vial was stored at 45° C. After 30 days a sample of the gas in the headspace was collected from each of the vials and analyzed for chlorine content. The results are presented in Table III below.

COMPARATIVE EXAMPLES B AND C

The procedure of Examples 4 and 5 was repeated using a granular hydrated calcium hypochlorite having the following analysis:

| | Weight Percent |
|---|---|
| Ca(OCl)$_2$ | 71.88 |
| Ca(OH)$_2$ | 2.99 |
| CaCl$_2$ | 0.14 |
| CaClO$_3$ | 1.72 |
| NaCl | 16.48 |
| H$_2$O | 6.80 |

The results are listed in Table III below.

TABLE III

| Chlorine in Headspace After 30 Days | | | |
|---|---|---|---|
| Ambient Temperature Parts Per Million | | | 45° C. % |
| Example 4 | 7 | Example 5 | 8.6 |
| Comparative Example B | 81 | Comparative Example C | 17.8 |

What is claimed is:

1. A process for producing a neutral calcium hypochlorite cake which comprises reacting lime with a chlorinating agent consisting of a hypochlorous acid solution containing at least 35 percent by weight of HOCl at a temperature in the range of from about 15° to about 40° C. to produce a slurry of calcium hypochlorite dihydrate having a solids concentration of from about 5 to about 20 percent, and separating a mother liquor to produce a neutral calcium hypochlorite cake consisting essentially of calcium hypochlorite and water, the cake having less than about 5 percent by weight of all inert materials of which less than about 1.5 percent by weight is an alkali metal chloride.

2. The process of claim 1 in which the inert materials consist of chlorides and calcium salts.

3. The process of claim 1 in which the temperature is in the range of from about 25° to about 35° C.

4. The process of claim 1 in which the hypochlorous acid solution contains at least 40 percent by weight of HOCl.

* * * * *